Jan. 2, 1945.  G. E. ARMINGTON  2,366,587
HYDRAULIC DOOR OPERATING DEVICE
Filed May 27, 1942  2 Sheets-Sheet 1

INVENTOR
GEORGE E. ARMINGTON
BY
Hyde and Meyer
ATTORNEYS

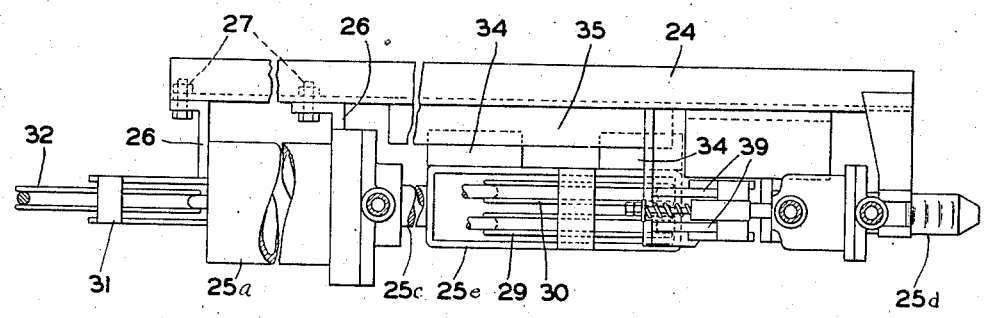
FIG.-5
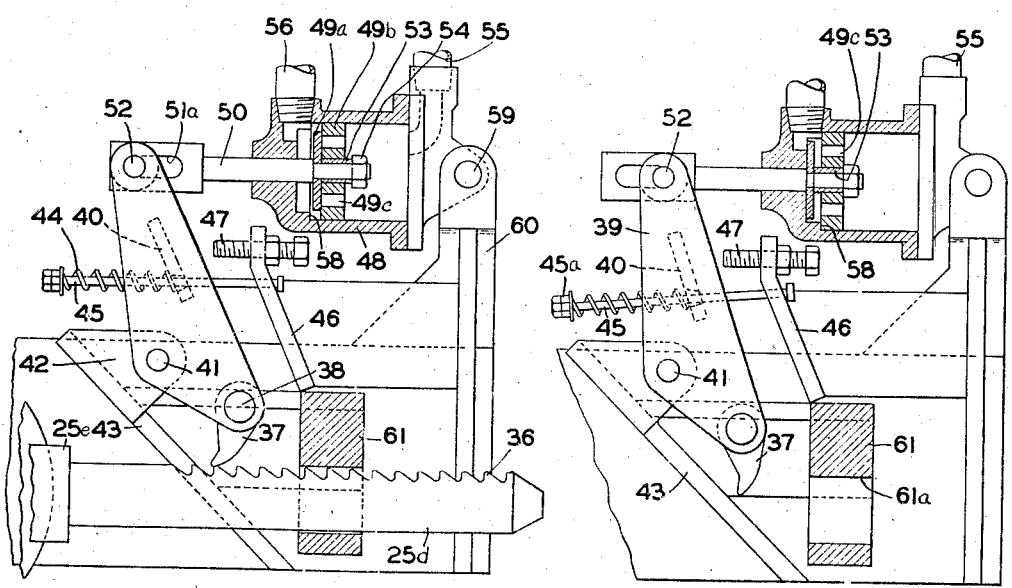
FIG.-6
FIG.-7
INVENTOR
GEORGE E. ARMINGTON

Patented Jan. 2, 1945

2,366,587

UNITED STATES PATENT OFFICE 2,366,587

HYDRAULIC DOOR OPERATING DEVICE

George E. Armington, South Euclid, Ohio, assignor to The Euclid Road Machinery Co., Euclid, Ohio, a corporation of Ohio Application May 27, 1942, Serial No. 444,726

2 Claims. (Cl. 121—40)

This invention relates to improvements in hydraulic operating devices such as are used for operating the dumping doors of material hauling vehicles.

My invention relates to a fluid operated device for closing the doors of a dump wagon or the like, which is simple in its construction and operation so that it is cheap to build, and efficient in use. Certain improvements are incorporated, such as means for automatically releasing the door holding device upon the application of power to the motor in door releasing direction and other advantages in construction and operation of my improved device will be apparent from the accompanying specification and drawings, the essential features of which are summarized in the appended claims.

Figure 1:
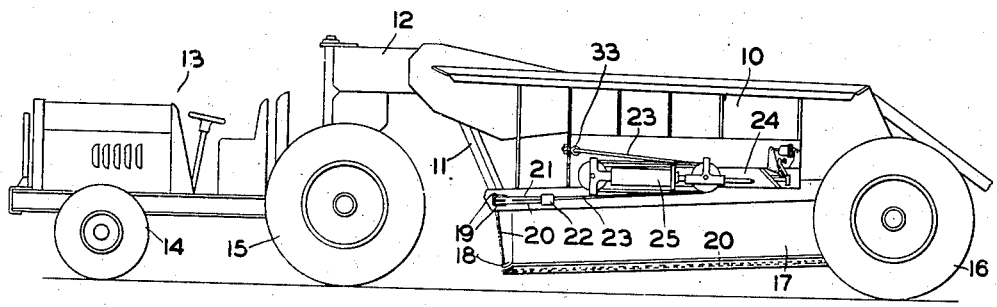
Figure 2:
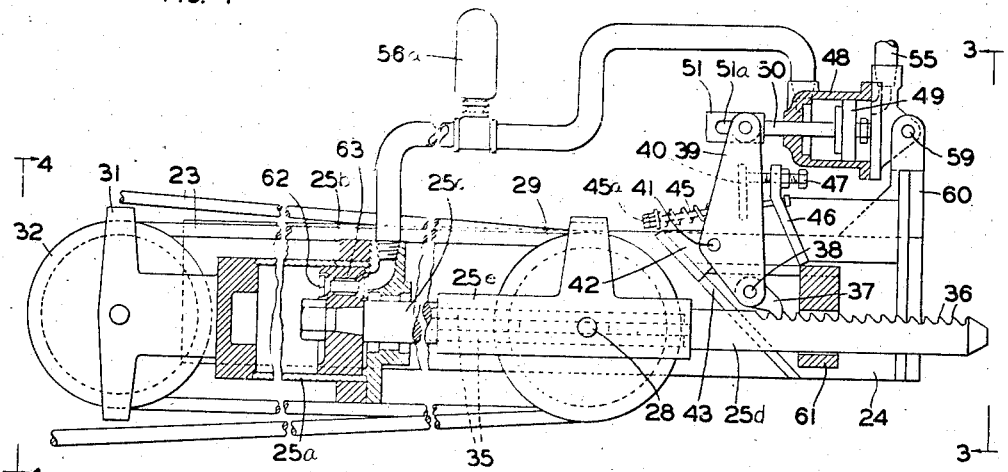
Figures 3, 4:
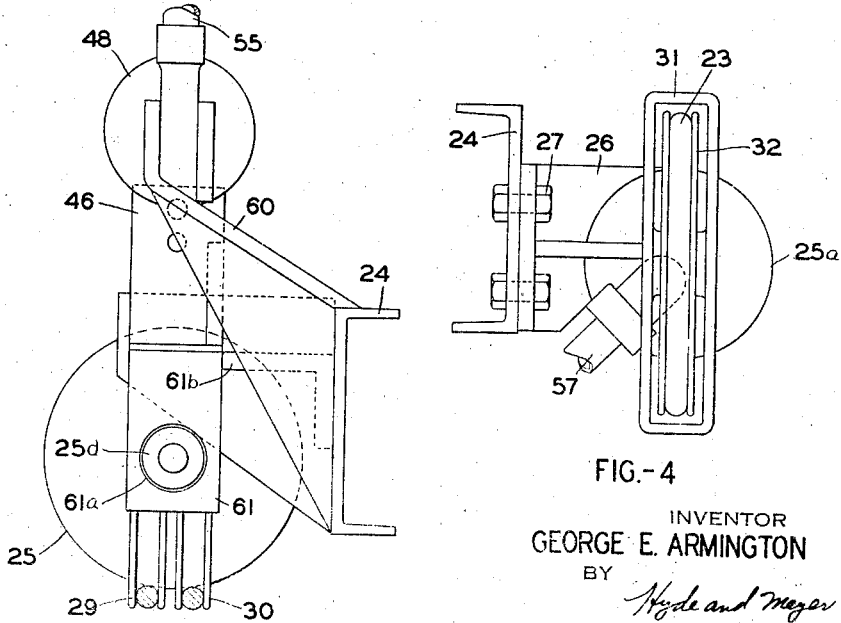

In the drawings, Fig. 1 is a side elevational view of a drop-bottom dump wagon of a trailer type mounted behind a tractor; Fig. 2 is an enlarged side elevational view of the door closing device shown on the side of the wagon in Fig. 1, portions of the device being broken away to more clearly show the construction; Fig. 3 is an end view, enlarged, taken at the right-hand end of Fig. 2; Fig. 4 is an enlarged end elevational view taken from the left end of Fig. 2; Fig. 5 is a top plan view of the device of Fig. 2; while Figs. 6 and 7 are enlarged fragmental side elevational views taken at the right-hand end of Fig. 2 showing different positions of the parts.

For purposes of illustration I have shown my invention as applied to a wagon of the general type shown and described in Patent No. 2,233,193 granted February 25, 1941, to myself and Stewart F. Armington. This is a trailer dump wagon open at the top and having side walls 10, end walls 11 and a drawbar 12 which is mounted on the rear end of a tractor 13. The wheels 14 and 15 are part of the tractor and a pair of wheels 16 support the rear end of the wagon. The bottom of the wagon is closed by a pair of doors 17, each of which is hinged along the bottom of one of the side walls 10, these doors when closed meeting along the longitudinal center line of the dump body so as to completely close the same. The doors are controlled by conventionally rigged cables, there being one cable for each door. Each cable has a fixed connection at the rear of the body, then passes around a sheave (not shown) at the rear free corner of the door 17, then along the side of the door, around sheave 18 at the front free corner of the door, then around a sheave at the center of the lower front end of the body, then laterally around a sheave 19 at the corner of the body as shown in Fig. 1, there being two of these sheaves, one to accommodate the cable 20 for the door on the near side and one for the cable 21 which controls the door on the far side. These cables are connected by a clamp 22 to a single cable 23 which passes to the power device.

This power device is mounted in its entirety upon a long channel 24 which is secured to the side 10 of the wagon body with the flanges facing toward the body as best seen in Figs. 3 and 5. This channel is secured to the body in any suitable manner by means not shown. Preferably it will be bolted to the body so that it can be attached or removed as desired. On the forward end of this channel as best seen in Fig. 5 is mounted the cylinder 25a of a cylinder and piston motor 25, as by means of brackets 26 and bolts 27. Within the cylinder is a piston 25b which is mounted on the piston rod 25c. This rod is rigid with and alined with the rear piston rod portion 25d, the two portions 25c and 25d being connected by a hollow yoke portion 25e which is best seen in Figs. 2 and 5. Rotatably mounted within the yoke 25e on shaft 28 are the two sheaves 29 and 30. Rigidly mounted on the forward end of cylinder 25a is a bracket 31 in which is rotatably mounted the sheave 32. The cable 23 passes from the clamp 22 rearwardly and around sheave 29, then forwardly around sheave 32, rearwardly around sheave 30 and forwardly to point 33 where it is attached to the side of the wagon body.

Means is provided for preventing turning of the piston rods 25c and 25d and the yoke 25e. This comprises a pair of horizontally alined fins 34 rigidly mounted on yoke 25e on the side toward the wagon body. These fins engage in a slot formed by a pair of parallel flanges 35 which are welded or otherwise secured to the web of channel 24. This construction is best seen in Figs. 2 and 5.

It will be understood from the above description that upon a stroke of piston 25b rearwardly or toward the right as viewed in Figs. 1, 2 and 5, a pull will be exerted on cable 23 sufficient to close the doors 17. Pawl and ratchet means are provided for holding the doors closed. This comprises a series of teeth 36 formed in the upper surface of the piston rod portion 25d. A pawl or dog 37 is pivotally mounted on pin 38 in lever 39. This lever comprises a pair of parallel triangular shaped plates rigidly secured together by a plate 40 extending at right angles between them and welded to both of them. The lever thus formed rotatably carries the pin 38 just mentioned. The lever is pivotally mounted on a pin 41 which passes through suitable openings in lever 39 and an alined opening in ear 42 on bracket member 43 which extends at right angles to the web of channel 24. The lever 39 is biased in a clockwise direction by means of spring 44 which is held between plate 40 and a head 45a on bolt 45 which passes through a suitable opening in plate 40 and also through an opening in fixed bracket 46. This bracket is rigidly secured to the channel 24. An adjustable stop pin 47 is threaded through bracket 46 and engages plate 40 as best seen in Fig. 2 to limit the movement of lever 39 in a clockwise direction. In this position of the parts the dog 37 hangs downwardly as shown in Fig. 7 in position to be engaged by the piston rod portion 25d as it moves toward the right during the closing of the dump wagon doors. During such closing operation the dog 37 rides along the teeth 36 until the doors reach closed position at which time the power is cut off from motor 25 and the tendency of the doors to open causes a pressure from teeth 36 against the nose of dog 37 in the position of the parts shown in Fig. 2. Here the center line of pin 38 is slightly below a straight line drawn between the nose of dog 37 and the center of pivot pin 41. The dog 37 and lever 39 thus form an over-center toggle holding the doors in closed position against the tendency of gravity and the load on the doors tending to open them.

Power means is provided for releasing the doors for a dumping operation. This means comprises a small servomotor 48 having a compound piston 49 and a piston rod 50 which carries a slotted end portion 51 having a slot 51a in which pin 52 rides. This pin is carried in the upper end of lever 39. A stroke of piston 49 toward the left as viewed in Fig. 2 will cause counterclockwise movement of lever 39 so as to carry pin 38 upwardly toward the right across the line between the nose of dog 37 and the center of pivot pin 41. When the parts reach this position the pull of the doors tending to move piston rod portion 25d toward the left will snap pawl 37 to the position shown in Fig. 6 at which time the pin 52 will jump to the left end of slot 51a as shown in Fig. 6. The teeth 36 will then move past the dog 37 in its position shown in Fig. 6 permitting the bottom dump doors of the wagon to fly open.

Means is provided to release the holding dog 37 automatically upon the supply of operating fluid to motor 25 in door opening direction. For this purpose the piston 49 is made in two parts as best seen in Figs. 6 and 7. On a reduced end of the rod 50 is a solid disk portion 49a. This is held in fixed position by a sleeve 53 and a nut 54. The other portion of piston 49 is a circular disk 49b slidably mounted on the sleeve 53 and fitting snugly on the sleeve 53 and against the side walls of the servo-motor 48. Operating fluid is supplied to the right-hand end of motor 48 through conduit 55. The left end of motor 48 is connected by conduit 56 to the right-hand end of cylinder 25a. The left-hand end of cylinder 25a has a conduit connection 57 for a purpose later described. When piston 49 is in the position of Fig. 2 and fluid under pressure, such as oil, is supplied to conduit 55, the piston will travel toward the left causing counterclockwise movement of lever 39 and releasing the dog 37 from its holding position as previously described. Some yielding means is preferably provided to permit this movement of piston 49 and release of dog 37 before piston 25b starts on its door-releasing stroke. For instance, an expansion chamber 56a may be provided in conduit 56 to accommodate the oil displaced by piston 49. The kick of lever 39 as the holding dog lets go, aided by the fluid entering through conduit 55, will move piston 49 to the position shown in Fig. 6. Shortly after this the disk 49b is held against the shoulder 58 on the interior wall of the servomotor while the disk 49a travels farther toward the left uncovering a series of openings 49c through the disk 49b. This permits the motive fluid to pass through the piston 49 and conduit 56 to the right-hand end of cylinder 25a so as to move piston 25b in door-opening direction. The fluid, in the case of oil or the like, at this time will travel out conduit 57 to the system not shown which supplies the motive power. When piston 25b moves in the opposite direction or toward the right as seen in Fig. 2 by means of motive fluid supplied through conduit 57, fluid will be forced through conduit 56 against disk 49b, holding this disk in its position toward the right on sleeve 53 as shown in Fig. 7 so that fluid can escape through the openings 49c and conduit 55 during this operation. The lever 39 at this time is moved in a clockwise direction by the action of spring 44.

The servomotor 48 has a trunnion mounting on pin 59 which is held in bracket 60 rigidly carried by channel 24.

Preferably means is provided for supporting the piston rod portion 25d which may be of considerable extent where a long stroke is necessary to close the door 17. I have here shown a block 61 welded to angle 61b which in turn is welded to channel 24 and provided with an opening 61a which somewhat closely embraces the piston rod portion 25d.

A valve 62 may be provided if desired to close an opening 63 through piston 25b if desired. This valve is of a known type adapted in the position of Fig. 2 to close the opening through the piston when pressure fluid is supplied to the right-hand end of cylinder 25a but adapted to engage the left-hand head of the cylinder when the piston reaches the end of its stroke so as to open the passageway through the piston and provide a by-pass for relieving excess pressure. The valve acts in a similar fashion when it strikes the other end of the cylinder upon a stroke being made in the opposite direction.

What I claim is:

1. Operating and control means for a cylinder and piston motor having a piston rod provided with ratchet teeth, comprising a lever pivotally mounted on a fixed support, a dog pivotally mounted on said lever and adapted when in latched position to engage and hold said ratchet teeth, a pressure fluid supply for moving said motor, said fluid supply including a servomotor cylinder in series with the supply, a piston in said last named cylinder having a valved opening therethrough, said last named piston having a piston rod provided with a lost motion connection with said lever, said valved opening being so constructed and arranged that it is held closed by pressure fluid supply to said servomotor cylinder in dog-unlatching direction, the first portion of the movement of said servomotor piston in dog-unlatching direction causing said lever and dog to move to unlatching position, said lost motion connection permitting said unlatching movement of said dog and lever, means for causing opening of said valved opening during the latter portion of said movement of said servomotor piston in dog-unlatching direction whereby pressure fluid may flow to said first named motor, and biasing means for returning said lever and dog to potential latching position, said lost motion connection permitting said returning movement of said lever and dog while said servomotor piston is still in its position for causing dog unlatching.

2. Operating and control means for a cylinder and piston motor having a movable member provided with ratchet teeth wherein means attached to said movable member tends to move the latter in a certain direction, comprising a lever having a relatively fixed pivot, a dog pivotally mounted on said lever and in latching position engaging said ratchet teeth, a cylinder and piston servomotor having a piston rod connected with said lever by a lost motion connection, pressure on said dog in latching position holding said servomotor piston at one end of its cylinder, a pressure fluid supply communicating with said one end of said servomotor cylinder, a pressure fluid conduit communicating from the other end of said servomotor cylinder to said first named motor for moving the movable member of the latter in said certain direction, there being relatively movable parts on said servomotor piston providing a valved opening therethrough, pressure fluid supplied at said one end of said servomotor cylinder holding said parts in valve closing position, the first portion of the stroke of said servomotor piston toward the other end of its cylinder causing unlatching movement of said dog and lever, means operative near the other end of said servomotor piston stroke for opening said valved opening, and biasing means for then returning said dog and lever to potential latching position.

GEORGE E. ARMINGTON.